United States Patent
Mituta et al.

(10) Patent No.: US 11,362,524 B2
(45) Date of Patent: Jun. 14, 2022

(54) BATTERY SYSTEM AND A METHOD FOR USE IN THE BATTERY SYSTEM

(71) Applicant: GM GLOBAL TECHNOLOGY OPERATIONS LLC, Detroit, MI (US)

(72) Inventors: Andres V. Mituta, Lake Orion, MI (US); Shifang Li, Shelby Township, MI (US); Emil Francu, Northville, MI (US); Garrett M. Seeman, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 16/792,584

(22) Filed: Feb. 17, 2020

(65) Prior Publication Data

US 2021/0257843 A1   Aug. 19, 2021

(51) Int. Cl.
*H02J 7/00* (2006.01)
*B60L 58/12* (2019.01)
*B60L 50/60* (2019.01)
*B60L 53/62* (2019.01)

(52) U.S. Cl.
CPC ............ *H02J 7/0024* (2013.01); *B60L 50/66* (2019.02); *B60L 53/62* (2019.02); *B60L 58/12* (2019.02); *H02J 7/0014* (2013.01); *H02J 7/0048* (2020.01)

(58) Field of Classification Search
USPC ................................................. 320/109, 112
See application file for complete search history.

(56) References Cited

U.S. PATENT DOCUMENTS

| | | | | |
|---|---|---|---|---|
| 5,225,761 | A * | 7/1993 | Albright | H02J 7/1423 320/117 |
| 6,741,065 | B1 * | 5/2004 | Ishii | B60L 53/14 320/122 |
| 9,537,331 | B2 * | 1/2017 | Kim | H02J 7/0016 |
| 9,579,961 | B2 * | 2/2017 | Harris | B60K 16/00 |
| 2004/0257041 | A1 * | 12/2004 | Nagaoka | H02J 7/0024 320/128 |
| 2012/0249058 | A1 * | 10/2012 | Kuraishi | B60L 58/22 320/107 |
| 2019/0126761 | A1 | 5/2019 | Verbridge | |
| 2019/0283611 | A1 | 9/2019 | Conlon et al. | |

\* cited by examiner

*Primary Examiner* — Samuel Berhanu
(74) *Attorney, Agent, or Firm* — Quinn IP Law

(57) ABSTRACT

A battery system and a method include an auxiliary power module configured to support auxiliary loads. A first contactor switch connected between first and second battery packs, and a second contactor switch is in series with the first contactor switch. A controller determines whether to open or close first and second contactor switches depending on whether the battery packs are being charged in a high voltage mode or a low voltage mode. The contactor switches are both closed when in the high voltage mode and at least one of the contactor switches is opened when in the low voltage mode. At least one of the first and second battery packs operate to power the auxiliary power module while charging at least one of the first and second battery packs regardless of whether the battery packs are in the high voltage mode or the low voltage mode.

20 Claims, 3 Drawing Sheets

| | SA1 | SA2 | SA3 | SB1 | SB2 | SB3 | S1 | S2 | OB1 | OB2 | Total Closed |
|---|---|---|---|---|---|---|---|---|---|---|---|
| PSA | X | X | O | X | X | O | O | O | O | O | 4 |
| 800V DCFC | $X_1$ | $X_1$ | X | $X_2$ | $X_2$ | X | X | X | O | O | 6 |
| 400V DCFC | X | X | X | X | X | X | O | O | O | O | 6 |
| 400V 22kW Chrg | X | X | O | X | X | O | O | O | X | X | 6 |
| 400V 11kW Chrg | X | X | O | X | X | O | O | O | O | O | 4 |

|  | SA1 | SA2 | SA3 | SB1 | SB2 | SB3 | S1 | S2 | OB1 | OB2 | Total Closed |
|---|---|---|---|---|---|---|---|---|---|---|---|
| PSA | X | X | O | X | X | O | O | O | O | O | 4 |
| 800V DCFC | $X_1$ | $X_1$ | X | $X_2$ | $X_2$ | X | X | X | O | O | 6 |
| 400V DCFC | X | X | X | X | X | X | O | O | O | O | 6 |
| 400V 22kW Chrg | X | X | O | X | X | O | O | O | X | X | 6 |
| 400V 11kW Chrg | X | X | O | X | X | O | O | O | O | O | 4 |

BATTERY SYSTEM AND A METHOD FOR USE IN THE BATTERY SYSTEM

INTRODUCTION

Electric powertrains often include one or more polyphase/alternating current (AC) rotary electric machines constructed from a wound stator and a magnetic rotor. The stator windings are connected to an AC-side of a power inverter, with a direct current (DC)-side of the power inverter being connected to positive and negative rails of a DC voltage bus. When the electric machine functions as a traction motor, switching control of the ON/OFF states of individual semiconductor switches of the power inverter generates an AC output voltage at a level suitable for energizing the stator windings. The sequentially-energized stator windings produce a rotating magnetic field that ultimately interacts with a rotor field to produce machine rotation and motor output torque.

The DC voltage bus is electrically connected to a voltage source, which in mobile applications is typically embodied as a multi-cell battery pack. Voltage ratings of the types of battery packs currently used for energizing propulsion functions continue to increase to satisfy the demand for extended electric driving ranges. Battery charging infrastructure and associated charging methodologies likewise continue to evolve. For instance, some emerging DC fast-charging (DCFC) stations are capable of providing charging voltages of 800V or more, while older "legacy" DCFC stations may be capable of providing lower charging voltages, for instance 400V. In order to accommodate a wide range of possible charging voltages, some battery systems utilize multiple battery packs in lieu of a unitary battery. The individual battery packs of some battery systems, for instance, may be selectively connected in parallel during propulsion operations, and the reconfigured to a series connection during high-voltage charging operations, with the series connection of such a battery system configuration enabling utilization of higher charging voltages.

SUMMARY

The present disclosure provides a method for use of a battery system. The battery system includes positive and negative direct current (DC) voltage bus rails, first and second battery packs connected to the positive and negative DC bus rails, and an auxiliary power module configured to support auxiliary loads. The battery system also includes a first contactor switch connected between the first and second battery packs, and a second contactor switch in series with the first contactor switch between the first and second battery packs. A controller determines whether to open or close the first and second contactor switches depending on whether the first and second battery packs are being charged in a high voltage mode or a low voltage mode. The first and second contactor switches are both closed when in the high voltage mode which electrically connects the first and second battery packs in a series arrangement. At least one of the first and second contactor switches is opened when in the low voltage mode which electrically connects the first and second battery packs in a parallel arrangement. At least one of the first and second battery packs operate to power the auxiliary power module while charging at least one of the first and second battery packs regardless of whether the first and second battery packs are in the high voltage mode or the low voltage mode.

The method optionally includes one or more of the following:

A) an average energy difference is determined based on a maximum useable energy level and a remaining energy level to fully charged of the first battery pack, and an average energy difference is determined based on a maximum useable energy level and a remaining energy level to fully charged of the second battery pack;

B) one of the first and second battery packs is selected to supply the power to the auxiliary power module based on the smaller average energy difference;

C) the charging from the first battery pack is transitioned to the second battery pack and the power supplied from the second battery pack is transitioned to the first battery pack to operate the auxiliary power module when in the high voltage mode;

D) the second battery pack is signaled of a reduction of current during the power transition between the first and second battery packs;

E) the charging from the first battery pack is transitioned to the second battery pack and the power supplied is transitioned from the second battery pack to the first battery pack to operate the auxiliary power module when in the high voltage mode is based on the average energy difference compiled from the maximum useable energy level and the remaining energy level to fully charged of the first battery pack, and the average energy difference compiled from the maximum useable energy level and the remaining energy level to fully charged of the second battery pack;

F) the average energy difference is monitored based on the maximum useable energy level and the remaining energy level to fully charged of the first battery pack, and the average energy difference is monitored based on the maximum useable energy level and the remaining energy level to fully charged of the second battery pack to determine whether to transition the power supplied to the auxiliary power module from one of the first and second battery packs to the other one of the first and second battery packs;

G) a time remaining to charge the first and second battery packs is monitored to determine whether to transition the power supplied to the auxiliary power module from one of the first and second battery packs to the other one of the first and second battery packs;

H) a state-of-charge of the first battery pack and a state-of-charge of the second battery pack is monitored to determine whether to transition the power supplied to the auxiliary power module from one of the first and second battery packs to the other one of the first and second battery packs;

I) current in the parallel arrangement and current in the series arrangement are compared;

J) the charging of the first and second battery packs is completed in the parallel arrangement if the current in the parallel arrangement is greater than the current in the series arrangement;

K) one of the first and second battery packs is disconnected from charging and then the other one of the first and second battery packs is charged if the current in the parallel arrangement is less than the current in the series arrangement;

L) the at least one of the first and second contactor switches is signaled to open during the low voltage mode such that the first and second battery packs are in the parallel arrangement in which both of the first and second battery packs provides the power to the auxiliary power module while both of the first and second battery packs are charging;

M) the first and second contactor switches are signaled to close during the high voltage mode such that the first and second battery packs are in the series arrangement in which one of the first and second battery packs provide the power to the auxiliary power module and the other one of the first and second battery packs is charging;

N) the charging from the first battery pack is transitioned to the second battery pack and the power supplied from the second battery pack is transitioned to the first battery pack to operate the auxiliary power module when in the first and second battery packs are in the series arrangement; and O) the transitioning of charging does not occur when the first and second battery packs are in the parallel arrangement.

The present disclosure also provides a battery system that includes positive and negative direct current (DC) voltage bus rails, first and second battery packs each connected to the positive and negative DC voltage bus rails, and an auxiliary power module configured to support auxiliary loads. The auxiliary power module is in electrical communication with at least one of the first and second battery packs. The battery system further includes a first contactor switch connected between the first and second battery packs, and a second contactor switch in series with the first contactor switch between the first and second battery packs. The battery system also includes a controller in communication with the first and second contactor switches to selectively open and close the first and second contactor switches depending on whether the first and second battery packs are in a high voltage mode or a low voltage mode. The first and second contactor switches are both closed when in the high voltage mode which electrically connects the first and second battery packs in a series arrangement. At least one of the first and second contactor switches is opened when in the low voltage mode which electrically connects the first and second battery packs in a parallel arrangement. The controller is configured to determine which of the first and second battery packs operates to provide power to the auxiliary power module while at least one of the first and second battery packs charges regardless of whether the first and second battery packs are in the high voltage mode or the low voltage mode.

The battery system optionally includes one or more of the following:

A) the controller is configured to determine an average energy difference based on a maximum useable energy level and a remaining energy level to fully charged of the first battery pack, and determine an average energy difference based on a maximum useable energy level and a remaining energy level to fully charged of the second battery pack;

B) the controller selects one of the first and second battery packs to supply the power to the auxiliary power module based on the smaller average energy difference;

C) the controller is configured to signal the at least one of the first and second contactor switches to open during the low voltage mode such that the first and second battery packs are in the parallel arrangement in which both of the first and second battery packs provide the power to the auxiliary power module while both of the first and second battery packs are charging;

D) the controller is configured to transition charging from the first battery pack to the second battery pack and transition the power supplied from the second battery pack to the first battery pack to operate the auxiliary power module when in the high voltage mode;

E) the controller signals the second battery pack of a reduction of current during the power transition between the first and second battery packs;

F) the controller is configured to monitor the average energy difference based on the maximum useable energy level and the remaining energy level to fully charged of the first battery pack, and monitor the average energy difference based on the maximum useable energy level and the remaining energy level to fully charged of the second battery pack to determine whether to transition the power supplied to the auxiliary power module from one of the first and second battery packs to the other one of the first and second battery packs;

G) the controller is configured to monitor a time remaining to charge the first and second battery packs to determine whether to transition the power supplied to the auxiliary power module from one of the first and second battery packs to the other one of the first and second battery packs;

H) the controller is configured to monitor a state-of-charge of the first battery pack and a state-of-charge of the second battery pack to determine whether to transition the power supplied to the auxiliary power module from one of the first and second battery packs to the other one of the first and second battery packs;

I) the controller is configured to compare current in the parallel arrangement and current in the series arrangement, and the controller is configured to allow charging of the first and second battery packs to be completed in the parallel arrangement if the current in the parallel arrangement is greater than the current in the series arrangement; and J) the controller is configured to compare current in the parallel arrangement and current in the series arrangement, and the controller is configured to disconnect charging of one of the first and second battery packs if the current in the parallel arrangement is less than the current in the series arrangement, and then selects the other one of the first and second battery packs to charge.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
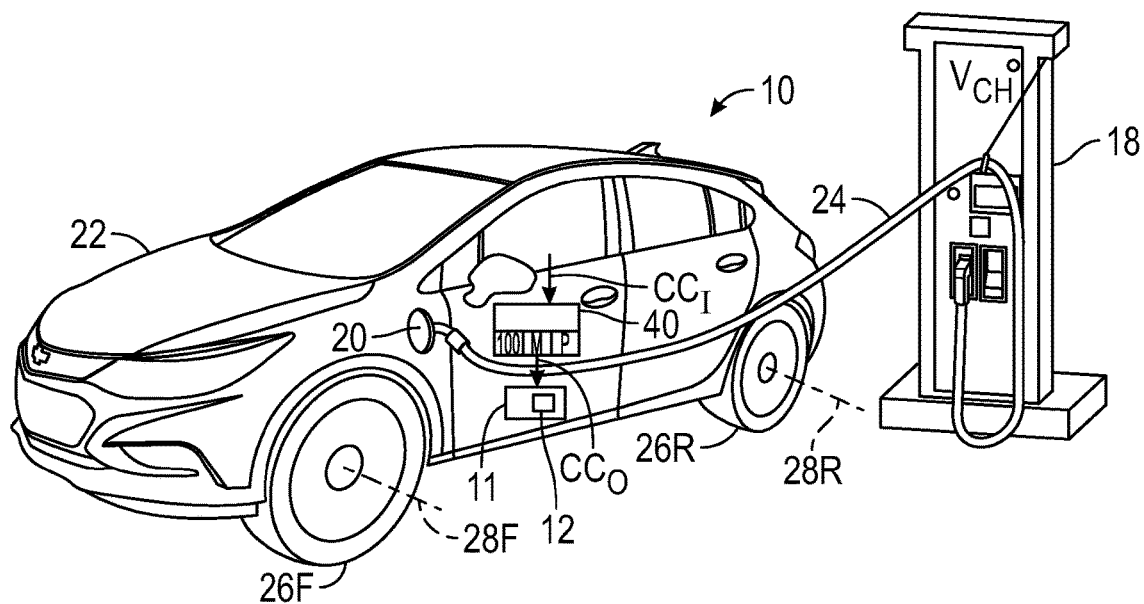
FIG. 1 is a schematic illustration of an example movable platform that uses a battery system that is undergoing a direct current fast-charging (DCFC) operation.

Referring to the FIGS., wherein like numerals indicate like or corresponding parts throughout the several views, a movable platform 10, such as a vehicle is generally shown in FIG. 1. The movable platform 10 may include an electric powertrain 11 and a battery system 12, which may be a multi-pack battery system 12 including one or more battery packs 14A, 14B. The battery system 12 may include positive and negative direct current (DC) voltage bus rails $16^+$, $16^-$, with first and second battery packs 14A, 14B each connected to the positive and negative DC voltage bus rails $16^+$, $16^-$. It is to be appreciated that more than two battery packs 14A, 14B may be connected to the bus rails $16^+$, $16^-$.

In the example configuration of FIG. 1, the electric powertrain 11 powers electric propulsion functions of the movable platform 10, which is a motor vehicle in FIG. 1. Non-limiting examples of the vehicle may include a car, a truck, a motorcycle, an off-road vehicle, a farm vehicle, a watercraft, an aircraft, rail vehicles, or any other suitable movable platform. Additionally, the vehicle may be a hybrid vehicle, an electric vehicle, etc. It is to be appreciated that alternatively, a non-vehicle application may be used, such as, farm equipment, stationary platforms, stationary or mobile power plants, robots, conveyors, transport platforms, etc. Therefore, the battery system 12 described herein may be used in rechargeable electrical systems for vehicle or non-vehicle applications. For illustrative purposes, the movable platform 10 of FIG. 1 will be described hereinafter in the context of a motor vehicle without limiting the present teachings to vehicle applications in general.

The movable platform 10 is shown undergoing a direct current fast-charging (DCFC) operation in which the battery system 12 is electrically connected to an off-board DCFC station 18, e.g., via a vehicle charging port 20 connected to a body 22 of the movable platform 10 that is internally connected to a DC charge connector using a length of high-voltage charging cable 24. Although not shown in FIG. 1, the end connection of the charging cable 24 may be an SAE J1772, CHAdeMO charge connector, or other suitable country-specific or application-specific charge coupler or plug.

The movable platform 10 may include front and rear wheels 26F, 26R, respectively, that engage a road surface. The front and rear wheels 26F, 26R may be connected to separate front and rear drive axles 28F, 28R. In an all-wheel drive (AWD) configuration, the drive axles 28F, 28R may be individually powered by separate rotary electric machines 30 (ME) each functioning as electric traction motors via corresponding power inverter module(s) 32 as shown in FIG. 2 and described below.

The battery system 12 is electrically connected to the DCFC station and an electrical load, such as but not limited to one or more power inverter modules 32 (PIM-A, PIM-B in FIG. 2), an auxiliary power module 34 (APM) and an on-board charging module 36 (OBCM) each being part of an integrated power electronics module 38 (IPEO), another on-board charging module (OBCDM), an air conditioning control module, etc. In FIG. 2, the IPEO 38 that is shown as part of the circuitry, is also shown enlarged separately from the circuitry to illustrate the APM 34 and the OBCM 36 that is part of the IPEO 38. The auxiliary power module 34 is configured to support auxiliary loads, such as accessories, which may include 12-volt accessories or other low voltage level accessories. The auxiliary power module 34 is in electrical communication with at least one of the first and second battery packs 14A, 14B. In other words, the auxiliary power module 34 may be electrically connected to the first battery pack 14A or the second battery pack 14B, or both of the battery packs 14A, 14B.

Figure 2:
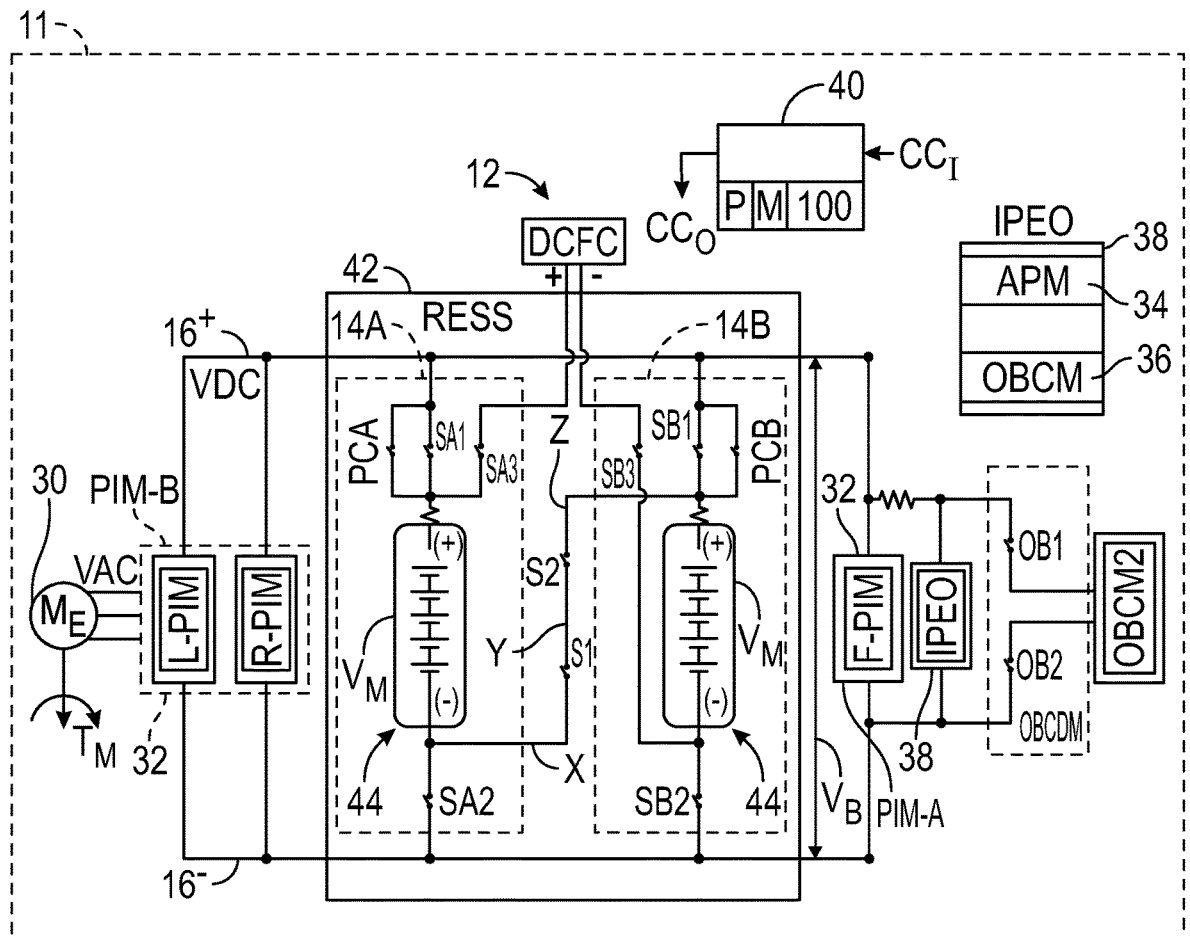
FIG. 2 is a schematic circuit diagram of the battery system.

Referring to FIG. 2, the electrical load may also include one or more rotary electric machine 30, such as the electric machine 30 ($M_E$) shown schematically and connected to the PIM-B 32. It is to be appreciated that another electric machine 30 may be connected to the PIM-A 32. The PIM-A 32 may be utilized with an electric machine 30 connected to the front wheels 26F of the movable platform 10 (F-PIM), and the PIM-B 32 may be utilized with an electric machine 30 connected to the rear wheels 26R of the movable platform 10. In certain configurations, the PIM-B 32 may optionally include a power inverter module 32 for an electric machine 30 that drives the left wheel 26R (L-PIM) and a power inverter module 32 for an electric machine 30 that drives the right wheel 26R (R-PIM).

The power inverter modules 32, such as the PIM-A or PIM-B, produce a polyphase/AC voltage (VAC) by way of internal switching control using pulse-width modulation, pulse-density modulation, or other suitable techniques. Continuing with FIG. 2, the AC voltage energizes phase windings of the electric machine(s) 30 to thereby produce motor torque (arrow $T_M$) on a rotor which is outputted to the drive axles 28F, 28R to drive one or more of the wheels 26F, 26R. While one electric machine 30 is shown in FIG. 2, the PIM-A 32 connected to battery pack 14B may likewise have a corresponding electric machine 30, e.g., to enable an all-wheel drive mode or to independently power one of the drive axles 28F, 28R of FIG. 1.

The battery packs 14A, 14B, which may use a lithium ion, zinc-air, nickel-metal hydride, lead acid, or other application-suitable battery chemistry, is selectively recharged via a DCFC charging voltage $V_{CH}$ from the off-board DCFC station 18. When the movable platform 10 is in operation, modulated switching control is performed by a controller 40 via control signals (arrow $CC_O$ in FIG. 1) to ultimately energize one or more electric machines 30 (see FIG. 2) to generate and deliver motor torque ($T_M$) to one or more of the wheels 26F, 26R, and to thereby propel the movable platform 10 and/or to perform other useful work. Thus, the battery packs 14A, 14B and the controller 40 together form the battery system 12, with other possible components such as thermal management/cooling and power electronic hardware which may be omitted in the figures for illustrative clarity. Therefore, generally, the controller 40 may be in electrical communication with the battery system 12. For example, the controller 40 may control the battery system 12 to charge the battery packs 14A, 14B as well as select which of the battery packs 14A, 14B will power the auxiliary power module 34.

The controller 40 may be a host machine or distributed system, e.g., a computer such as a digital computer or microcomputer. The controller 40 includes a processor P and a memory M, with the memory M including application-suitable amounts of tangible, non-transitory memory, e.g., read-only memory, whether optical, magnetic, flash, or otherwise. Instructions may be stored in the memory M of the controller 40 and automatically executed via the processor P of the controller 40 to provide the respective control functionality. The controller 40 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. Therefore, the controller 40 may include all software, hardware, memory, algorithms, connections, sensors, etc., necessary to control, for example, charging the battery system 12 and powering various components, such as the electric machine(s) 30 and the auxiliary power module 34. It is to be appreciated that the controller 40 may also include any device capable of analyzing data from various sensors, comparing data, making the necessary decisions required to control the battery system 12. Optionally, more than one controller 40 may be utilized. The controller 40 is programmed to execute instructions embodying a method 100 for use of the battery system 12, with the controller 40 receiving input signals (arrow $CC_I$) indicative of a drive-requested or autonomously-requested charging mode of the battery packs 14A, 14B and, in response, outputting the control signals ($CC_O$) to the battery packs 14A, 14B.

Some of the input signals (arrow $CC_I$) may be determined during a DCFC operation as part of ongoing communication between the controller 40 and the DCFC station of FIG. 1. Such communication occurs upon connection of the movable platform 10 to the DCFC station, such as when the DCFC station communicates its maximum charging voltage $V_{CH}$ to the controller 40. In a drive/propulsion mode, an operator-requested or autonomously-determined propulsion request may cause the controller 40 to establish a parallel-connected (P-connected) configuration of the battery packs 14A, 14B. In other words, when in the P-connected configuration, the battery packs 14A, 14B are in a parallel arrangement. During certain DCFC operations, the controller 40 may selectively reconfigure the battery packs 14A, 14B to a series-connected (S-connected) configuration to take advantage of the charging voltage $V_{CH}$, as will now be described with reference to FIG. 2. In other words, when in the S-connected configuration, the battery packs 14A, 14B are in a series arrangement.

Referring to FIG. 2, the battery system 12 may be part of a rechargeable energy storage system 42 (RESS) that is constructed from two or more battery packs 14A, 14B each having an associated battery module 44 in the form of interconnected battery cells, cell sense circuitry, etc. The battery modules 44 are substantially identical, i.e., have the same internal components and equal voltage capacities, e.g., of 300-500 volts DC (VDC), although other voltage levels may be envisioned. It is to be appreciated that more than two battery packsX may be used in other configurations, with the two battery packs 14A, 14B used hereinafter for illustrative purposes. The battery packs 14A, 14B may be disposed in the P-connected configuration, with the battery modules 44 in each of the battery packs 14A, 14B having a corresponding module voltage $V_m$, and with a battery pack voltage $V_B$ being equal to the module voltage $V_m$.

As an illustrative example, the module voltage $V_m$ may be in the range of about 300-500V. The charging voltage $V_{CH}$ from the DCFC station of FIG. 1 may either be in the same range, or the charging voltage $V_{CH}$ may be higher, for instance 600-1000V, with other battery and charging voltage levels also being usable within the scope of this disclosure. Thus, in the P-connected configuration, the battery system 12 has a battery pack voltage $V_B$ defined by the potential difference between positive and negative DC bus rails $16^+$, $16^-$, or more precisely the positive and negative terminals of the battery system 12, and that is equal to the module voltage $V_m$. In the S-connected configuration, however, the battery pack voltage $V_B$ is a multiple of the module voltage $V_m$, with the multiple being the number of S-connected battery packs 14A, 14B used in the construction of the battery system 12.

A switching control circuit is constructed from multiple switches SA1, SA2, SA3, PCA, SB1, SB2, SB3, PCB, S1, S2, OB1, OB2 as shown in FIG. 2 which is as an illustration of the reconfigurable nature of the battery system 12. Each of the depicted switches SA1, SA2, SA3, PCA, SB1, SB2, SB3, PCB, S1, S2, OB1, OB2 may be embodied as multiple switches in an actual implementation. Switches SA1, SA2, SA3, PCA, SB1, SB2, SB3, PCB, S1, S2, OB1, OB2 may be configured as solid-state switches, mechanical switches, i.e., spring-biased contactors having an ON/conducting state when closed and an OFF/non-conducting state when opened, electro-mechanical switches, such as contactors or relays, which can block current flow in either direction, semiconductor switches such as IGBTs, or MOSFETs, with or without anti-parallel connected diodes, employed singly or in combination, etc., and/or combinations thereof. Switch SA2 is connected between the negative (−) terminal of battery module 44 of the first battery pack 14A and the negative DC bus rail $16^-$, while switch SB1 is connected between the positive (+) terminal of the battery module 44 of the second battery pack 14B and the positive DC bus rail $16^+$.

Depending on the position of the switches SA1, SA2, SA3, PCA, SB1, SB2, SB3, PCB, S1, S2, OB1, OB2, the auxiliary power module 34 may be electrically connected to the first battery pack 14A or the second battery pack 14B, or both of the battery packs 14A, 14B. A first contactor switch S1 is connected between the first and second battery packs 14A, 14B, and a second contactor switch S2 is in series with the first contactor switch S1 between the first and second battery packs 14A, 14B. The first contactor switch S1 may be the switch S1 and the second contactor switch S2 may be the switch S2 in the figures. As such, switches S1, S2 in turn are disposed between the first and second battery packs 14A, 14B. Specifically, one side (X) of the switch S1 is connected between the switch SA2 and the negative (−) terminal of battery module 44 of the first battery pack 14A, and an opposing side (Y) of the switch S1 being connected between the positive (+) terminal of the battery module 44 of the second battery pack 14B and the switch SB1. Furthermore, one side (Y) of the switch S2 is connected between switch S1 from the side X and an opposing side (Z) of the switch S2 being connected between the positive (+) terminal of the battery module 44 of the second battery pack 14B and the switch SB1. Therefore, the switches S1, S2, that are disposed between the first and second battery packs 14A, 14B, are in series with each other, i.e., a series arrangement. As such, these switches S1, S2 may cooperate to provide switching function redundancy to the series path between the first and second battery packs 14A, 14B. In certain configurations, the contactor switch S1 is integral to/located fully within the first battery pack 14A and the contactor switch S2 is integral to/located fully within the second battery pack 14B.

When the switch S1 and/or the switch S2 are opened and the switches SA1 and SB1 are closed, the first and second battery packs 14A, 14B are connected in electrical parallel. When switches S1, S2 are closed and the switches SA2 and SB1 are opened, the first and second battery packs 14A, 14B are connected in electrical series. The battery pack voltage $V_B$ therefore increases when in the series arrangement relative to the voltage level in the parallel arrangement, and thus the battery system 12 is able to utilize a higher charging voltage.

Various switches SA1, SA2, SA3, PCA, SB1, SB2, SB3, PCB, S1, S2, OB1, OB2 may be used to control the battery system 12 as shown in FIG. 2. For instance, in the first battery pack 14A as viewed from left-to-right, switches PCA, SA1, and SA3 may be connected to the positive bus rail 16⁺ and the positive (+) terminal of the battery module 44 for the first battery pack 14A. A switch SA2 may be connected between the negative bus rail 16⁻ and the negative (−) terminal of the battery module 44 for the first battery pack 14A. Similarly in the second battery pack 14B, again viewed from left-to-right, switches SB3, SB1, and PCB may be used between the positive bus rail 16⁺ and the positive (+) terminal of the battery module 44 of the second battery pack 14B, while a switch SB2 may be connected between the negative bus rail 16" and the negative (−) terminal of the battery module 44 of the second battery pack 14B.

In the labeling nomenclature used herein, "S" refers generally to "switch", regardless of construction, while "1", "2", and "3" are used as nominal switch identifiers. "A" generally refers to the features of the first battery pack 14A and "B" generally refer to the features of the second battery pack 14B. "PC" refers to "pre-charge", with the two pre-charge switches PCA and PCB used to ensure the voltage bus is sufficiently charged before opening the pre-charge switches PCA and PCB. It is to be appreciated that each pre-charge switch PCA and PCB is connected in series with a pre-charge resistor to help limit in-rush currents when the pre-charge switches PCA and PCB are initially closed.

Figures 3, 4:
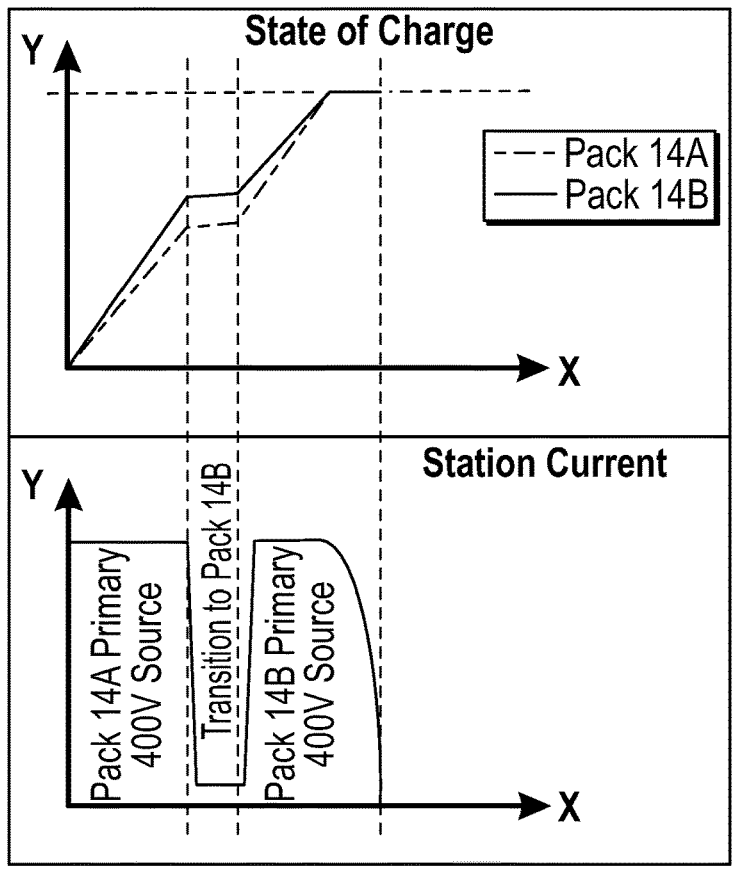
FIG. 3 is a table of possible series and parallel operating modes and corresponding switching states to control the battery system.
FIG. 4 is a graph of a state of charge of a first battery pack and a second battery pack aligned with a graph of a station current from an off-board DCFC station that charges the first battery pack and the second battery pack.

The battery system 12 may be controlled by the controller 40 using switching control logic, as illustrated in a logic table of FIG. 3, to perform charging of the first and second battery packs 14A, 14B and/or propulsion of the movable platform 10. The far left column of FIG. 3 indicates the various propulsion and charging modes of the battery packs 14A, 14B and the top row of FIG. 3 identifies the various switches SA1, SA2, SA3, SB1, SB2, SB3, S1, S2, OB1, OB2 that correspond to FIG. 2. As described below, the disclosed configuration of the battery system 12 enables selection by the controller 40 of one or more parallel charge modes and series charge modes, which include, for example, 800V DCFC, 400V DCFC, 400V 22 kilowatt (kW) charging, 400V 11 kW charging. In addition, the disclosed configuration of the battery system 12 enables selection by the controller 40 of one or more propulsion modes, which include a propulsion system active (PSA) mode. The logic table is populated with corresponding mode-specific switch open/closed states, with "0" corresponding to an open switch state in which an open circuit is formed, i.e., the switch is not conducting electricity, and "X" corresponding to a closed switch state in which the switch is conducting. "$X_n$" corresponds to one of the switches being closed but not both of the switches being closed in the logic table. For example, the 800V DCFC charging mode in the logic table identifies switches SA1 and SA2 as $X_1$, which means SA1 or SA2 is closed, but both are not closed. The far-right column of FIG. 3 identifies the total number of switches that are closed for each of the charging modes and the propulsion mode.

As mentioned above, the controller 40 is in communication with the switches SA1, SA2, SA3, PCA, SB1, SB2, SB3, PCB, S1, S2, OB1, OB2, which includes the first and second contactor switches S1, S2. Generally, the controller 40 determines whether to open or close the first and second contactor switches S1, S2 depending on whether the first and second battery packs 14A, 14B are being charged in a high voltage mode or a low voltage mode. As such, the controller 40 signals the first and second contactor switches S1, S2 to selectively open and close depending on whether the battery packs 14A, 14B are in the high or low voltage mode.

The first and second contactor switches S1, S2 are both closed when in the high voltage mode which electrically connects the first and second battery packs 14A, 14B in a series arrangement. The high voltage mode may be when combining the battery packs 14A, 14B in series for 600V or higher. During charging while in the series arrangement, one of the battery packs 14A, 14B is charged at a time and the other one of the battery packs 14A, 14B provides power to the auxiliary power module. The controller 40 determines which one of the battery packs 14A, 14B will be charged and which one will provide power to the auxiliary power module 34. This is, both of the battery packs 14A, 14B will not provide power to the auxiliary power module at the same time during charging.

At least one of the first and second contactor switches S1, S2 is opened when in the low voltage mode which electrically connects the first and second battery packs 14A, 14B in a parallel arrangement. For example, when referring to at least one of the first and second contractor switches S1, S2 is opened when in the low voltage mode, the first contactor switch S1 is opened, or the second contactor switch S2 is opened, or both of the first and second contactor switches S1, S2 are opened. The low voltage mode may be when the battery packs 14A, 14B are in parallel for 300V-500V. During charging while in the parallel arrangement, both of the battery packs 14A, 14B will provide power to the auxiliary power module 34 while both of the battery packs 14A, 14B are being charged. This is, both of the battery packs 14A, 14B will provide power to the auxiliary power module at the same time during charging.

Therefore, at least one of the first and second battery packs 14A, 14B operate to power the auxiliary power module 34 while charging at least one of the first and second battery packs 14A, 14B regardless of whether the first and second battery packs 14A, 14B are in the high voltage mode or the low voltage mode. That is, in certain charging operations, the first battery pack 14A can power the auxiliary power module 34 while the second battery pack 14B is charging, the second battery pack 14B can power the auxiliary power module 34 while the first battery pack 14A is charging, or both of the first and second battery packs 14A can power the auxiliary power module 34 while both of the first and second battery packs 14A, 14B are charging. Simply stated, the controller 40 is configured to determine which of the first and second battery packs 14A, 14B operates to provide power to the auxiliary power module 34 while at least one of the first and second battery packs 14A, 14B charges.

Various information is collected, monitored, etc., to determine which of the battery packs 14A, 14B will be charged while at least one of the battery packs 14A, 14B provide power to the auxiliary power module 34, some of which are discussed below. Depending on whether the battery packs 14A, 14B are in the high voltage mode (in the series arrangement) or the low voltage mode (in the parallel arrangement) will determine whether one or both of the battery packs 14A, 14B are supplying the power to the auxiliary power module 34 as detailed below.

The at least one of the first and second contactor switches S1, S2 is signaled to open during the low voltage mode such that the first and second battery packs 14A, 14B are in the parallel arrangement in which both of the first and second battery packs 14A, 14B provides the power to the auxiliary power module 34 while both of the first and second battery packs 14A, 14B are charging. Therefore, both of the battery packs 14A, 14B simultaneously power the auxiliary power module 34 while both of the first and second battery packs 14A, 14B are simultaneously charging. Again, as mentioned above, the first contactor switch S1 may be open, the second contactor switch S2 may be open, or both of the first and second contactor switches S1, S2 may be open in the parallel arrangement.

The first and second contactor switches S1, S2 are signaled to close during the high voltage mode such that the first and second battery packs 14A, 14B are in the series arrangement in which one of the first and second battery packs 14A, 14B provide the power to the auxiliary power module 34 and the other one of the first and second battery packs 14A, 14B is charging. In this configuration, one of the battery packs 14A, 14B is providing the power while the other one of the battery packs 14A, 14B is charging. Therefore, both of the battery packs 14A, 14B do not perform the same operation (i.e., charging and powering) at the same time when in the series arrangement.

Generally, the controller 40 determines when to transition charging between the first and second battery packs 14A, 14B when in the series arrangement, and additionally, when to transition the power being supplied to operate the auxiliary power module 34. For example, in certain configurations, the controller 40 determines that the first battery pack 14A will charge while the second battery pack 14B supplies the power to the auxiliary power module 34 when in the series arrangement. When the controller 40 determines it is time to transition, the charging from the first battery pack 14A is transitioned to the second battery pack 14B and the power supplied from the second battery pack 14B is transitioned to the first battery pack 14A to operate the auxiliary power module 34 when in the first and second battery packs 14A, 14B are in the series arrangement. The transitioning of charging does not occur when the first and second battery packs 14A, 14B are in the parallel arrangement. Furthermore, the transitioning of the power supply does not occur when the first and second battery packs 14A, 14B are in the parallel arrangement.

The controller 40 uses various information to determine when to transition between the battery packs 14A, 14B when in the series arrangement, and examples of the information and the transitioning are discussed below.

An average energy difference (of the first battery pack 14A) is determined (via the controller 40) based on a maximum useable energy level of the first battery pack 14A and a remaining energy level to fully charged of the first battery pack 14A. An average energy difference (of the second battery pack 14B) is determined (via the controller 40) based on a maximum useable energy level of the second battery pack 14B and a remaining energy level to fully charged of the second battery pack 14B. Therefore, the controller 40 is configured to determine the maximum useable energy level of each of the first and second battery packs 14A, 14B and the remaining energy level to fully charged of the first and second battery packs 14A, 14B, and uses that information to determine the average energy difference of each of the battery packs 14A, 14B. The average energy difference of the first battery pack 14A and the average energy difference of the second battery pack 14B assumes that the state of charge and the voltage of the first battery pack 14A is similar or equal to the state of charge and the voltage of the second battery pack 14B.

Generally, the controller 40 is configured to select one of the first and second battery packs 14A, 14B to supply the power the auxiliary power module 34 based on a comparison of the maximum useable energy level and the remaining energy level to fully charged of the first battery pack 14A and the maximum useable energy level and the remaining energy level to fully charged of the second battery pack 14B. Therefore, the controller 40 selects one of the first and second battery packs 14A, 14B to supply the power the auxiliary power module 34 based on a comparison of the average energy difference of the first battery pack 14A and the average energy difference of the second battery pack 14B. One of the first and second battery packs 14A, 14B is selected (via the controller 40) to supply the power the auxiliary power module 34 based on the smaller average energy difference. For example, if the average energy difference of the first battery pack 14A is less than the average energy difference of the second battery pack 14B, the first battery pack 14A is selected to power the accessories because the accessory load would not affect the charging rate of the first battery pack 14A as much as the second battery pack 14B. The average energy difference of the first and second battery packs 14A, 14B may be used to determine which of the battery packs 14A, 14B supports the accessory load for the series arrangement.

When the remaining energy level to fully charged of the first and second battery packs 14A, 14B are the same or equal, the battery pack 14A, 14B that is powering the accessories should be transitioned to the other battery pack 14A, 14B, and then repeated back and forth at a quicker rate to ensure that the charging rate remains balanced. Generally, in this situation, the battery packs 14A, 14B should be switched back and forth using the calculation of charging time remaining divided by two to ensure that the charging rates remain balanced. This calculation also assumes that the state of charge and the voltage of the first battery pack 14A is similar or equal to the state of charge and the voltage of the second battery pack 14B.

For example, when the first and second contactor switches S1, S2 are closed, the first battery pack 14A may be charging in the high voltage mode and the second battery pack 14B may be providing the power to the auxiliary power module 34 when in the high voltage mode. In certain configurations, the charging from the first battery pack 14A is transitioned to the second battery pack 14B and the power supplied from the second battery pack 14B is transitioned to the first battery pack 14A to operate the auxiliary power module 34 when in the high voltage mode is based on the average energy difference compiled from the maximum useable energy level and the remaining energy level to fully charged of the first battery pack 14A, and the average energy difference compiled from the maximum useable energy level and the remaining energy level to fully charged of the second battery pack 14B.

The controller 40 may monitor various parameters to determine when to transition between the battery packs 14A, 14B. As such, the average energy difference may be monitored (via the controller 40) based on the maximum useable energy level and the remaining energy level to fully charged of the first battery pack 14A, and the average energy difference may be monitored (via the controller 40) based on the maximum useable energy level and the remaining energy level to fully charged of the second battery pack 14B to determine whether to transition the power supplied to the auxiliary power module 34 from one of the first and second battery packs 14A, 14B to the other one of the first and second battery packs 14A, 14B. Additionally, a time remaining to charge the first and second battery packs 14A, 14B may be monitored (via the controller 40) to determine whether to transition the power supplied to the auxiliary power module 34 from one of the first and second battery packs 14A, 14B to the other one of the first and second battery packs 14A, 14B. Furthermore, a state-of-charge of the first battery pack 14A and a state-of-charge of the second battery pack 14B may be monitored (via the controller 40) to determine whether to transition the power supplied to the auxiliary power module 34 from one of the first and second battery packs 14A, 14B to the other one of the first and second battery packs 14A, 14B.

Generally, charging is transitioned from one of the battery packs 14A, 14B to the other one of the battery packs 14A, 14B to complete or fully charge the battery packs 14A, 14B, and correspondingly, the power to operate the auxiliary power module 34 is transitioned to the other one of the battery packs 14A, 14B. The controller 40 is configured to transition the charging and the power supply between the battery packs 14A, 14B. Therefore, for example, charging is transitioned from the first battery pack 14A to the second battery pack 14B, and the power supplied to the auxiliary power module 34 is transitioned from the second battery pack 14B to the first battery pack 14A when in the high voltage mode.

During this transition, as best shown in FIG. 4 via the aligned graphs, the state of charge graph illustrates that the state of charge of the first and second battery packs 14A, 14B level off at the same time that the current supplied to charge one of the battery packs 14A, 14B is reduced per the station current graph. Therefore, the controller 40 signals the off-board DCFC station 18 to reduce the current being supplied to the battery pack 14A, 14B being charged per the station current graph. The y-axis of the state of charge graph may represent a percentage of the level of the charge of the battery 14A, 14B, and the x-axis of the state of charge graph may represent time. Additionally, the y-axis of the station current graph may represent the current and the x-axis of the station current graph may represent time.

In one example, when the second battery pack 14B is being charged, the second battery pack 14B is signaled of a reduction of current during the power transition between the first and second battery packs 14A, 14B. In another example, when the first battery pack 14A is being charged, the first battery pack 14A is signaled of a reduction of current during the power transition between the first and second battery packs 14A, 14B. For example, in FIG. 4, referring to the station current graph, the first battery pack 14A is initially selected to power the accessories, and hence, powers the auxiliary power module 34, and the second battery pack 14B charges at that time. When the transition occurs in FIG. 4, current to the second battery pack 14B is reduced to transition charging to the first battery pack 14A, and current to power the accessories is reduced to transition the power supplied to the accessories from the first battery pack 14A to the second battery pack 14B. Now, referring to the state of charge graph in FIG. 4, the state of charge of the second battery pack 14B is greater than the state of charge of the first battery pack 14A but the state of charge of each of the battery packs 14A, 14B level off during this transition period. Once the transition is complete, as shown in the station charge of FIG. 4, the first battery pack 14A is being charged while the second battery pack 14B powers the accessories, i.e., powers the auxiliary power module 34. The reduction of current that occurs in the station current graph may be a station minimum current and margin (as one non-limiting example, the current drops to 10 ampere) to avoid an interruption in the charging session of the off-board DCFC station 18. By reducing the current during the transition between the battery packs 14A, 14B, this provides a fault tolerance to the low voltage or 12V accessories. Therefore, reducing the current during the transition protects the low voltage or 12V accessories, and also prevents an interruption in power to one or more of the switches SA1, SA2, SA3, PCA, SB1, SB2, SB3, PCB, S1, S2, OB1, OB2. It is to be appreciated that transitioning between the first and second battery packs 14A, 14B may occur at full current (i.e., no drop of current to the station minimum) if there is high confidence in the low voltage or 12V accessories.

Figure 5:
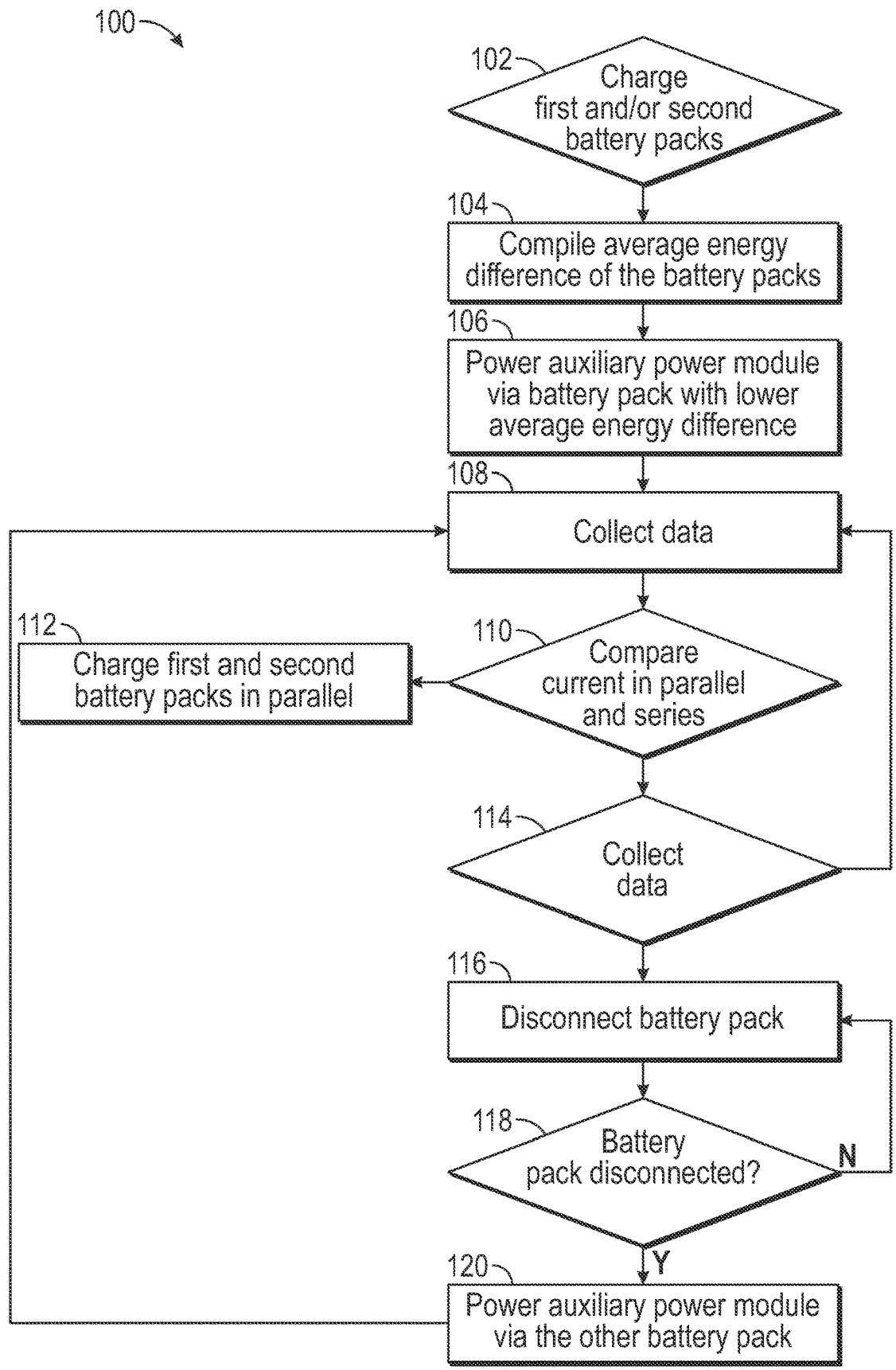
FIG. 5 is a flow chart describing a method for using the battery system of FIGS. 1-4 according to the present disclosure.

FIG. 5 depicts a flow chart describing the method 100 of using the battery system 12. The controller 40 monitors, collects data, makes decisions, open/closes various switches SA1, SA2, SA3, PCA, SB1, SB2, SB3, PCB, S1, S2, OB1, OB2 depending on the desired propulsion mode and/or charging mode. Referring to FIG. 5, the method 100 begins by the controller 40 starting charging at block 102. During this method 100, charging may be occurring with both of the first and second battery packs 14A, 14B in the parallel arrangement or charging may be occurring with one battery pack 14A, 14B at a time in the series arrangement. Furthermore, charging may be switched from the series arrangement to the parallel arrangement at a certain point in the method 100 as discussed further below. Generally, the method 100 of FIG. 5 starts at block 102 with the battery packs 14A, 14B in the series arrangement.

At block 104, the average energy difference may be used to determine which of the battery packs 14A, 14B will power the accessories. Specifically at block 104, the controller 40 compares the average energy difference (which may be determined by subtracting the remaining energy level to fully charged from the maximum usable energy) of the first battery pack 14A and the average energy difference (which may be determined by subtracting the remaining energy level to fully charged from the maximum usable energy) of the second battery pack 14B. Continuing with block 104, the accessories are powered off of the battery pack 14A, 14B with the higher average energy difference (i.e., the battery pack 14A, 14B that requires more charging) via the controller 40.

Next, at block 106, the controller 40 connects the battery pack 14A, 14B with the lower average energy difference (i.e., the least energy difference) to power the accessories at 300V-500V power. At block 108, the controller 40 collects and/or determines the difference of the voltage, the difference of the state of charge and the elapsed time of the first and second battery packs 14A, 14B, and uses this data to determine whether to switch or transition the accessories to the other battery pack 14A, 14B.

Current in the parallel arrangement and current in the series arrangement is compared (via the controller 40) at block 110. Depending on the results of the comparison at block 110, the method 100 will continues with the battery packs 14A, 14B in the series arrangement or will switch to the battery packs 14A, 14B being in the parallel arrangement to complete charging.

At block 112, charging of the first and second battery packs 14A, 14B is completed in the parallel arrangement if the current in the parallel arrangement is greater than the current in the series arrangement. Therefore, at block 112, the battery packs 14A, 14B switch from the series arrangement to the parallel arrangement.

Again, as mentioned above, at block 110, current in the parallel arrangement and current in the series arrangement is compared (via the controller 40). If the current in the parallel arrangement is less than the current in the series arrangement, then the battery packs 14A, 14B continue in the series arrangement to block 114. Generally, in certain configurations, charging may be disconnected from one of the first and second battery packs 14A, 14B and then the other one of the first and second battery packs 14A, 14B begins charging (via the controller 40) if the current in the parallel arrangement is less than the current in the series arrangement. In other words, the controller 40 is configured to disconnect charging of one of the first and second battery packs 14A, 14B if the current in the parallel arrangement is less than the current in the series arrangement, and then selects the other one of the first and second battery packs 14A, 14B to charge while also transitioning the power supplied to the auxiliary power module 34 to the other one of the first and second battery packs 14A, 14B.

If the current in the series arrangement is less than the current in the parallel arrangement, then the controller 40 may consider additional information at block 114. At block 114, the controller 40 collects and/or determines the difference of the voltage, the difference of the state of charge, the average energy difference, and compares the actual values with theoretical data. Continuing at block 114, the determined difference of the voltage is compared to the theoretical voltage difference, the determined difference of the state of charge is compared to the theoretical state of charge, and the determined average energy difference is comparted to the theoretical energy difference of each of the battery packs 14A, 14B. Continuing with block 114, if the theoretical data is greater than the actual data, then the method 100 returns to block 108.

If the determined difference of the voltage is greater than the theoretical voltage difference, the determined difference of the state of charge is greater than the theoretical state of charge, and the determined average energy difference is greater than or equal to the theoretical energy difference of each of the battery packs 14A, 14B then the method 100 proceeds to block 116. At block 116, the battery pack 14A, 14B that is powering the accessories is disconnected via the controller 40.

At block 118, the controller 40 confirms that the battery pack 14A, 14B was disconnected at block 116. If the battery pack 14A, 14B did not disconnect, the method 100 returns to block 116 to disconnect the battery pack 14A, 14B. Once the controller 40 confirms that the desired battery pack 14A, 14B was disconnected, the method 100 proceeds to block 120. At block 120, the other one of the first and second battery packs 14A, 14B begins powering the accessories, i.e., the auxiliary power module 34. The method 100 then returns to block 108 to repeat various blocks until each of the battery packs 14A, 14B are fully charged.

It is to be appreciated that the order or sequence of performing the method 100 as identified in the flowchart of FIG. 5 is for illustrative purposes and other orders or sequences are within the scope of the present teachings. It is to also be appreciated that the method 100 may include other features not specifically identified in the flowchart of FIG. 5.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A method for use of a battery system including positive and negative direct current (DC) voltage bus rails, first and second battery packs connected to the positive and negative DC bus rails, an auxiliary power module configured to support auxiliary loads, a first contactor switch connected between the first and second battery packs, and a second contactor switch in series with the first contactor switch between the first and second battery packs, the method comprising:
   determining, via a controller, whether to open or close the first and second contactor switches depending on whether the first and second battery packs are being charged in a high voltage mode or a low voltage mode;
   wherein the first and second contactor switches are both closed when in the high voltage mode which electrically connects the first and second battery packs in a series arrangement;
   wherein at least one of the first and second contactor switches is opened when in the low voltage mode which electrically connects the first and second battery packs in a parallel arrangement; and
   operating at least one of the first and second battery packs to power the auxiliary power module while charging at least one of the first and second battery packs regardless of whether the first and second battery packs are in the high voltage mode or the low voltage mode.

2. The method as set forth in claim 1 further comprising:
   determining an average energy difference based on a maximum useable energy level and a remaining energy level to fully charged of the first battery pack, and determining an average energy difference based on a maximum useable energy level and a remaining energy level to fully charged of the second battery pack; and
   selecting one of the first and second battery packs to supply the power to the auxiliary power module based on the smaller average energy difference.

3. The method as set forth in claim 1 further comprising transitioning charging from the first battery pack to the second battery pack and transitioning the power supplied from the second battery pack to the first battery pack to operate the auxiliary power module when in the high voltage mode.

4. The method as set forth in claim 3 further comprising signaling the second battery pack of a reduction of current during the power transition between the first and second battery packs.

5. The method as set forth in claim 3 wherein transitioning charging from the first battery pack to the second battery pack and transitioning the power supplied from the second battery pack to the first battery pack to operate the auxiliary power module when in the high voltage mode is based on an average energy difference compiled from a maximum useable energy level and a remaining energy level to fully charged of the first battery pack, and an average energy difference compiled from a maximum useable energy level and a remaining energy level to fully charged of the second battery pack.

6. The method as set forth in claim 3 further comprising monitoring an average energy difference based on a maximum useable energy level and a remaining energy level to fully charged of the first battery pack, and monitoring an average energy difference based on a maximum useable energy level and a remaining energy level to fully charged of the second battery pack to determine whether to transition the power supplied to the auxiliary power module from one of the first and second battery packs to the other one of the first and second battery packs.

7. The method as set forth in claim 6 further comprising monitoring a time remaining to charge the first and second battery packs to determine whether to transition the power supplied to the auxiliary power module from of the one of the first and second battery packs to the other one of the first and second battery packs.

8. The method as set forth in claim 7 further comprising monitoring a state-of-charge of the first battery pack and a state-of-charge of the second battery pack to determine whether to transition the power supplied to the auxiliary power module from one of the first and second battery packs to the other one of the first and second battery packs.

9. The method as set forth in claim 1 further comprising:
comparing current in the parallel arrangement and current in the series arrangement; and
charging of the first and second battery packs is completed in the parallel arrangement if the current in the parallel arrangement is greater than the current in the series arrangement.

10. The method as set forth in claim 1 further comprising:
comparing current in the parallel arrangement and current in the series arrangement; and
disconnect charging of one of the first and second battery packs and then charging the other one of the first and second battery packs if the current in the parallel arrangement is less than the current in the series arrangement.

11. The method as set forth in claim 1 further comprising signaling the at least one of the first and second contactor switches to open during the low voltage mode such that the first and second battery packs are in the parallel arrangement in which both of the first and second battery packs provide the power to the auxiliary power module while both of the first and second battery packs are charging.

12. The method as set forth in claim 1 further comprising signaling the first and second contactor switches to close during the high voltage mode such that the first and second battery packs are in the series arrangement in which one of the first and second battery packs provide the power to the auxiliary power module and the other one of the first and second battery packs is charging.

13. The method as set forth in claim 1:
further comprising transitioning charging from the first battery pack to the second battery pack and transitioning the power supplied from the second battery pack to the first battery pack to operate the auxiliary power module when in the first and second battery packs are in the series arrangement; and
wherein the transitioning of charging does not occur when the first and second battery packs are in the parallel arrangement.

14. A battery system comprising:
positive and negative direct current (DC) voltage bus rails;
first and second battery packs each connected to the positive and negative DC voltage bus rails;
an auxiliary power module configured to support auxiliary loads, and the auxiliary power module is in electrical communication with at least one of the first and second battery packs;
a first contactor switch connected between the first and second battery packs;
a second contactor switch in series with the first contactor switch between the first and second battery packs;
a controller in communication with the first and second contactor switches to selectively open and close the first and second contactor switches depending on whether the first and second battery packs are in a high voltage mode or a low voltage mode;
wherein the first and second contactor switches are both closed when in the high voltage mode which electrically connects the first and second battery packs in a series arrangement;
wherein at least one of the first and second contactor switches is opened when in the low voltage mode which electrically connects the first and second battery packs in a parallel arrangement; and
wherein the controller is configured to determine which of the first and second battery packs operates to provide power to the auxiliary power module while at least one of the first and second battery packs charges regardless of whether the first and second battery packs are in the high voltage mode or the low voltage mode.

15. The system as set forth in claim 14 wherein the controller is configured to determine an average energy difference based on a maximum useable energy level and a remaining energy level to fully charged of the first battery pack, and determine an average energy difference based on a maximum useable energy level and a remaining energy level to fully charged of the second battery pack.

16. The system as set forth in claim 15 wherein the controller selects one of the first and second battery packs to supply the power to the auxiliary power module based on the smaller average energy difference.

17. The system as set forth in claim 14 wherein the controller is configured to signal the at least one of the first and second contactor switches to open during the low voltage mode such that the first and second battery packs are in the parallel arrangement in which both of the first and second battery packs provide the power to the auxiliary power module while both of the first and second battery packs are charging.

18. The system as set forth in claim 14 wherein the controller is configured to transition charging from the first battery pack to the second battery pack and transition the power supplied from the second battery pack to the first battery pack to operate the auxiliary power module when in the high voltage mode.

19. The system as set forth in claim 18 wherein the controller signals the second battery pack of a reduction of current during the power transition between the first and second battery packs.

20. The system as set forth in claim 18:
wherein the controller is configured to monitor an average energy difference based on a maximum useable energy level and a remaining energy level to fully charged of the first battery pack, and monitor an average energy difference based on a maximum useable energy level and a remaining energy level to fully charged of the second battery pack to determine whether to transition the power supplied to the auxiliary power module from one of the first and second battery packs to the other one of the first and second battery packs;

wherein the controller is configured to monitor a time remaining to charge the first and second battery packs to determine whether to transition the power supplied to the auxiliary power module from one of the first and second battery packs to the other one of the first and second battery packs;

wherein the controller is configured to monitor a state-of-charge of the first battery pack and a state-of-charge of the second battery pack to determine whether to transition the power supplied to the auxiliary power module from one of the first and second battery packs to the other one of the first and second battery packs;

wherein the controller is configured to compare current in the parallel arrangement and current in the series arrangement, and the controller is configured to allow charging of the first and second battery packs to be completed in the parallel arrangement if the current in the parallel arrangement is greater than the current in the series arrangement; and wherein the controller is configured to compare current in the parallel arrangement and current in the series arrangement, and the controller is configured to disconnect charging of one of the first and second battery packs if the current in the parallel arrangement is less than the current in the series arrangement, and then selects the other one of the first and second battery packs to charge.

* * * * *